(12) United States Patent
Gensler et al.

(10) Patent No.: US 8,367,579 B2
(45) Date of Patent: Feb. 5, 2013

(54) SELF-CLEANING SURFACE COATING (PHOTOCATALYSIS)

(75) Inventors: Rudolf Gensler, The Sterling (SG); Heinrich Kapitza, Fürth (DE); Heinrich Zeininger, Obermichelbach (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 12/377,295

(22) PCT Filed: Aug. 14, 2007

(86) PCT No.: PCT/EP2007/058394
§ 371 (c)(1),
(2), (4) Date: Apr. 15, 2010

(87) PCT Pub. No.: WO2008/020014
PCT Pub. Date: Feb. 21, 2008

(65) Prior Publication Data
US 2010/0204037 A1 Aug. 12, 2010

(30) Foreign Application Priority Data
Aug. 17, 2006 (DE) .......... 10 2006 038 593

(51) Int. Cl.
*B01J 23/00* (2006.01)
*C09D 1/00* (2006.01)
*C09C 1/36* (2006.01)
*C01G 23/047* (2006.01)
*B32B 5/16* (2006.01)
*B32B 17/10* (2006.01)
*G11B 11/105* (2006.01)
*G11B 5/64* (2006.01)

(52) U.S. Cl. ........ 502/350; 423/610; 428/327; 428/332; 428/334; 428/336; 106/286.4; 106/286.8; 106/436

(58) Field of Classification Search .................. 502/350; 423/610; 428/327, 332, 334, 336; 106/286.4, 106/286.8, 436
See application file for complete search history.

(56) References Cited

U.S. PATENT DOCUMENTS

| | | | | |
|---|---|---|---|---|
| 5,811,192 A * | 9/1998 | Takahama et al. | ............ | 428/432 |
| 5,853,866 A * | 12/1998 | Watanabe et al. | .......... | 428/312.8 |
| 6,027,766 A * | 2/2000 | Greenberg et al. | ........... | 427/226 |
| 6,413,581 B1 * | 7/2002 | Greenberg et al. | ........... | 427/226 |
| 6,576,589 B1 * | 6/2003 | Na et al. | ........................ | 502/350 |
| 6,803,077 B2 * | 10/2004 | Yu | ............................... | 427/376.2 |
| 7,049,002 B2 * | 5/2006 | Greenberg et al. | ........... | 428/432 |
| 7,144,840 B2 * | 12/2006 | Yeung et al. | .................. | 502/350 |
| 7,235,305 B2 * | 6/2007 | Hasskerl et al. | .............. | 428/447 |

(Continued)

FOREIGN PATENT DOCUMENTS

| EP | 1291331 A | 3/2003 |
|---|---|---|
| EP | 1498176 A | 1/2005 |

(Continued)

OTHER PUBLICATIONS

International PCT Search Report and Written Opinion, PCT/EP2007/058394, 14 pages, mailed Jan. 18, 2008.

*Primary Examiner* — Patricia L Hailey
(74) *Attorney, Agent, or Firm* — King & Spalding L.L.P.

(57) ABSTRACT

A self-cleaning surface coating is easy and inexpensive to produce because it has only a simple titanium dioxide layer.

12 Claims, 1 Drawing Sheet

U.S. PATENT DOCUMENTS

| | | | | |
|---|---|---|---|---|
| 7,510,763 B2 * | 3/2009 | Gueneau et al. | | 428/307.7 |
| 7,534,293 B2 * | 5/2009 | Hong et al. | | 106/287.19 |
| 7,763,565 B2 * | 7/2010 | Fu et al. | | 502/350 |
| 7,935,329 B2 * | 5/2011 | Im et al. | | 423/610 |
| 7,955,687 B2 * | 6/2011 | Nghiem et al. | | 428/172 |
| 2003/0215647 A1 * | 11/2003 | Yoshida et al. | | 428/428 |
| 2004/0127354 A1 * | 7/2004 | Andrews | | 502/349 |
| 2006/0254461 A1 * | 11/2006 | Hong et al. | | 106/287.19 |
| 2007/0218264 A1 * | 9/2007 | Gueneau et al. | | 428/220 |
| 2011/0155409 A1 * | 6/2011 | Du et al. | | 174/50 |

FOREIGN PATENT DOCUMENTS

WO     03/102056    * 12/2003

* cited by examiner

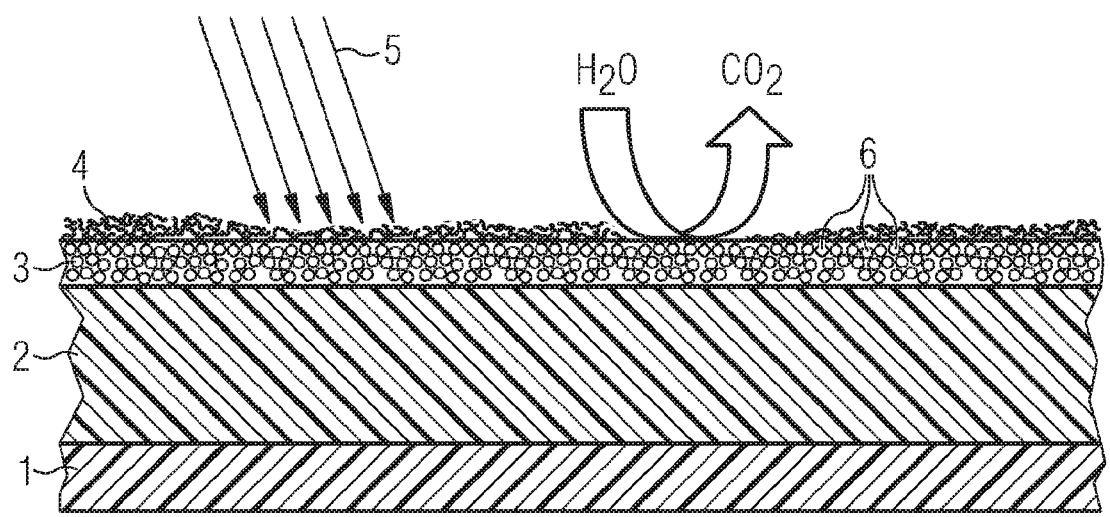

SELF-CLEANING SURFACE COATING (PHOTOCATALYSIS)

CROSS-REFERENCE TO RELATED APPLICATIONS

This application is a U.S. National Stage Application of International Application No. PCT/EP2007/058394 filed Aug. 14, 2007, which designates the United States of America, and claims priority to German Patent Application No. 10 2006 038 593.4 filed Aug. 17, 2006. The contents of these applications are incorporated herein in their entirety by this reference.

TECHNICAL FIELD

The invention relates to a self-cleaning surface coating which is easy and inexpensive to produce.

BACKGROUND

The effect of photocatalysis has been known for a long time and is utilized in particular for oxidizing and/or degrading organic compounds (e.g. soiling) on substrates under sunlight or artificial light. The same oxidation reaction can be used in the chemical industry and in the water processing field, for example, for selectively oxidizing or degrading chemical compounds and microbes.

Photocatalytically active coatings must have adequate mechanical and chemical stability. This should not be at the expense of the activity of the coating; the coating must exhibit an adequate amount of activity even under modest solar radiation, e.g. during the winter.

Photocatalytic coatings are already known. In the case of plastic substrates or painted substrates (e.g. painted metal sheets), however, a protective layer must be applied in order to prevent oxidation of the substrate, said layer being then covered by the actual photocatalytically active layer. This double coating is disadvantageous in terms of production costs and service life of the systems.

SUMMARY

According to various embodiment, a photocatalytically active surface coating can be provided which can be easily and economically applied to plastic or plastic-coated surfaces and has a long service life.

According to an embodiment, a photocatalytic coating may comprise a layer of titanium dioxide nanoparticles.

According to a further embodiment, the nanoparticles may have a maximum particle diameter of 100 nm. According to a further embodiment, the coating may have a thickness of less than 5 µm. According to a further embodiment, the coating may be transparent.

According to another embodiment, in a method for producing a photocatalytic coating, at least one titanium dioxide suspension is initially applied to the plastic surface in a wet chemical method, and the plastic surface including coating is then tempered.

According to a further embodiment of the method, the titanium dioxide suspension can be a commercially available suspension. According to a further embodiment of the method, the coating can be tempered at a temperature of 50° C. to 150° C. for a time period of 30 minutes to 5 hours.

According to another embodiment, a coating as described above can be used as a self-cleaning surface coating.

BRIEF DESCRIPTION OF THE DRAWINGS

A FIGURE illustrating the invention is described below and relates to an exemplary embodiment.

DETAILED DESCRIPTION

According to various embodiments a photocatalytic coating may comprise a layer of titanium dioxide nanoparticles.

According to other embodiments, the coating can be used as a self-cleaning surface coating. Finally, according to yet other embodiments a photocatalytic coating can be produced, wherein at least one titanium dioxide suspension is initially applied, e.g. by means of a wet chemical method, to a plastic surface which is not fully cured and the coated plastic surface is then fully cured.

Wet chemical methods include e.g. dip coating, doctoring, spraying, centrifugal and/or flow coating. All of these methods can be utilized according to various embodiments for producing the photocatalytic coating.

According to an embodiment, the titanium dioxide nanoparticles that are used have a dimension (particle diameter) of <100 nm. Possible plastic surfaces to which the suspension is applied include e.g. thermosetting compositions, in particular polyurethanes, epoxy resins, acrylic resins, silicone resins and/or silicone paints, alkyd, phenolic and melanin resins and/or paints.

The surfaces are e.g. paints which cover a machine, a pump, a blade wheel, a funnel, etc. or paints which are applied to external surfaces. Finally, the possible plastic surfaces can also be films of a thermosetting composition, to which the self-cleaning coating is applied.

According to an embodiment, the transparent self-cleaning coating is applied to a transparent plastic surface, thereby resulting in a transparent self-cleaning surface coating.

For example, it is possible to cover films and/or glasses, the latter being inorganic or organic, with a transparent surface of thermosetting composition which is then covered according to various embodiments with the self-cleaning coating using the wet chemical method.

It is therefore possible to produce self-adhesive films which stick on one side and have the self-cleaning coating on the other side according to various embodiments and can be adhered to e.g. facades, windows, glass used in automobiles, plastic parts used in automobiles and the like.

It is equally possible already during production for the plastic parts of automobiles, buildings, scoreboards, traffic signs, and other parts that are used outdoors to be furnished with a titanium dioxide coating according to various embodiments, thereby resulting in a self-cleaning effect under radiation.

According to an embodiment, the titanium dioxide suspension is a commercially available suspension, e.g. the VP dispersion W740X produced by the company Degussa or the Hombikat TiO2 dispersions produced by the company Sachtleben.

According to an embodiment, the coating is transparent.

According to an embodiment of the method, solidification takes place at 50° C. to 150° C. In this case the coating can be tempered over a time period of between 30 minutes and 5 hours.

According to various embodiments, the $TiO_2$ particles of the coating are present in high concentration only at the surface of the plastic matrix. This allows a very good cleaning effect at the same time as protecting the resin matrix by means of UV absorption in the $TiO_2$ layer (UV block). The damage to the lower layer is prevented by the TiO₂ particle layer. A separate protection layer for paints is therefore unnecessary.

The invention is described in greater detail below with reference to a number of tests which were carried out using the coating:

Substrates (PMMA baseplates) were initially coated using a PU paint. The PU paint was then briefly dried (30 minutes) at room temperature. The titanium dioxide dispersion was then applied to the not yet fully cured PU paint by means of dip coating and then hardened at 100° C. A substrate with fully hardened PU paint was used as a reference sample. A thin layer of ethyl stearate was then applied to the samples thus prepared, in order to simulate a film of dirt.

The samples were then placed under a UV lamp for 30 minutes. As a result of the UV effect, the ethyl stearate layers on $TiO_2$-containing layers were degraded and completely removed. The effect was confirmed several times. The cleaned surfaces cannot be distinguished from the unsoiled coatings. There is no depletion of the ethyl stearate on the samples without a titanium dioxide layer.

Following the UV irradiation, clear yellowing was evident in the samples without a titanium dioxide covering. By contrast, samples with a TiO2 covering remain almost unchanged. This proves that the TiO2 layer offers UV protection for the underlying paint surface.

The sole FIGURE shows a layer structure comprising a backing film 1 that can also be an inorganic or organic glass and is covered by the plastic surface, this being a polyurethane surface 2 which is not yet fully cured in this case, on which the titanium dioxide nanoparticles of the titanium dioxide coating 3 according to various embodiments are deposited in direct contact. The active nanoparticles 6 that are used have e.g. a dimension of <100 nm, though smaller and/or larger particle sizes and mixtures of different particle size fractions may be used according to various embodiments. The particles are distributed in a relatively uniform manner and stick to the organic network of the plastic 2, e.g. the thermosetting composition.

An organic layer of dirt 4 is deposited on the coating 2 according to various embodiments and is destroyed by UV radiation 5 on the titanium dioxide surface. The water and carbon dioxide that are released are emitted directly into the environment and cannot penetrate and damage the resin, as can occur in the prior art where titanium dioxide particles were embedded into the plastic matrix.

The approach according to various embodiments is above all characterized in that the titanium dioxide particles are present in high concentration at the surface of the plastic matrix only. This allows a very good cleaning effect at the same time as protecting the resin matrix by means of UV absorption in the $TiO_2$ layer (UV block). Damage to the lower layer is prevented by the titanium dioxide particle layer. A protective layer for paints is unnecessary. This system is also very suitable for the "in mold" method.

Other embodiments relate to a self-cleaning surface coating which is easy and inexpensive to produce because it comprises only a simple titanium dioxide layer.

The invention claimed is:

1. A photocatalytic coating for a substrate comprising a layer of titanium dioxide nanoparticles, wherein the coating comprises the following layer structure:
   a plastic surface covering said substrate, and
   wherein the titanium dioxide nanoparticles are deposited on and in direct contact with said plastic surface and are present in high concentration only at said plastic surface, said plastic surface comprising polyurethane.

2. The coating according to claim 1, wherein the nanoparticles have a maximum particle diameter of 100 nm.

3. The coating according to claim 1, wherein the coating has a thickness of less than 5 µm.

4. The coating according to claim 1, wherein the coating is transparent.

5. A method for producing a photocatalytic coating, comprising the steps of: applying at least one titanium dioxide suspension initially to a plastic surface in a wet chemical method, and tempering the plastic surface including the coating.

6. The method according to claim 5, wherein the coating is tempered at a temperature of 50° C. to 150° C. for a time period of 30 minutes to 5 hours.

7. A method for providing a photocatalytic coating, comprising the steps:
   providing a substrate,
   depositing a plastic surface to cover said substrate, and
   depositing a layer of titanium dioxide nanoparticles on and in direct contact with said plastic surface such that titanium dioxide nanoparticles are present in high concentration only at said plastic surface, wherein the photocatalytic coating comprises the layer of titanium dioxide nanoparticles as a self-cleaning surface coating, said plastic surface comprising polyurethane.

8. The method as claimed in claim 7, wherein the nanoparticles have a maximum particle diameter of 100 nm.

9. The method as claimed in claim 7, wherein the coating has a thickness of less than 5 µm.

10. The method as claimed in claim 7, wherein the coating is transparent.

11. A method for providing a photocatalytic coating, comprising the steps:
    providing a substrate, and
    providing a photocatalytic coating as a self-cleaning surface coating, wherein the photocatalytic coating is produced by applying at least one titanium dioxide suspension initially to a plastic surface deposited on said substrate in a wet chemical method, and by tempering the plastic surface including the coating;
    wherein after tempering titanium dioxide nanoparticles are present in high concentration only at said plastic surface, said plastic surface comprising polyurethane.

12. The method as claimed in claim 11, wherein the coating is tempered at a temperature of 50° C. to 150° C. for a time period of 30 minutes to 5 hours.

* * * * *